Feb. 24, 1953  W. I. DENTON ET AL  2,629,730
SOLVENT EXTRACTION PROCESS
Filed Oct. 25, 1949
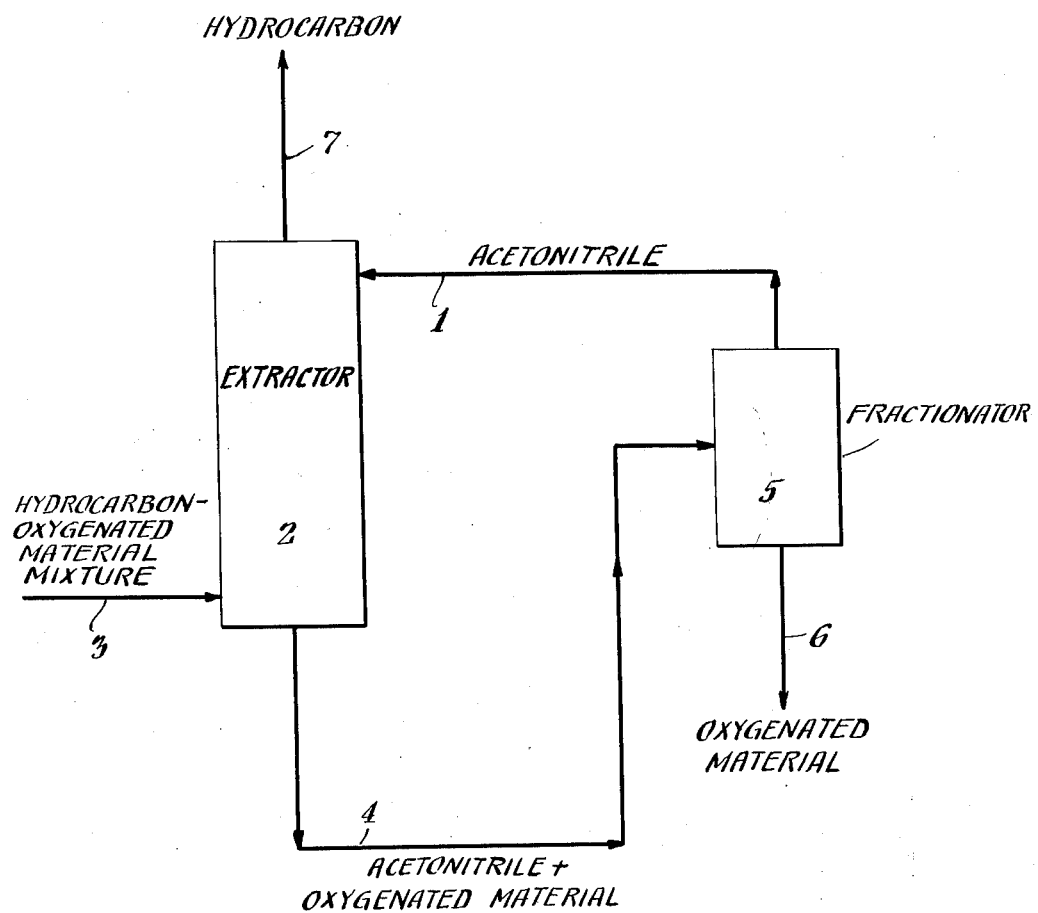
INVENTORS
William I. Denton
BY Richard B. Bishop
Robert D. Flynn
AGENT OR ATTORNEY Patented Feb. 24, 1953

2,629,730

UNITED STATES PATENT OFFICE 2,629,730

SOLVENT EXTRACTION PROCESS

William I. Denton, Woodbury, and Richard B. Bishop, Haddonfield, N. J., assignors to Socony-Vacuum Oil Company, Incorporated, a corporation of New York Application October 25, 1949, Serial No. 123,454

9 Claims. (Cl. 260—452)

This invention has to do with a solvent extraction process. More specifically, the invention has to do with a process for selectively separating hydrocarbons and organic oxygen compounds from mixtures containing the same.

During recent years, considerable attention has been given to the production of organic oxygen compounds from hydrocarbons by incomplete oxidation of the latter. While many of the oxidation processes developed to date have proven valuable for the production of oxygenated materials, such processes have been seriously handicapped by the difficulties attending separation of the numerous hydrocarbons and oxygenated materials present in the reaction products. This is well illustrated by processes developed for the oxidation of short chain hydrocarbons such as propane and butanes, wherein a complexity of acids, alcohols, aldehydes, esters, ketones, lactones, etc. are found in the reaction products together with various hydrocarbons. Many of the hydrocarbons and oxygenated materials either have similar boiling points or form azeotropes such that simple distillation procedures are of no avail in providing a separation. Complex distillation procedures, involving multiple azeotropic distillations for example, have been resorted to in order to solve the problem, but these involve considerable expense both in equipment and in operation. Chemical separation procedures have proven impractical in view of their extremely high cost. For example, an alkali or caustic treatment of the reaction products removes most of the acids, but does not effect a separation of other oxygenated materials. The separation problem is even more difficult when longer chain hydrocarbons, such as hexanes, heptanes and octanes found in gasolines, are oxidized. In the latter case, oxygenated materials range from formaldehyde through eight carbon atom acids. In addition, some of the hydrocarbons are cracked or degraded and polymerized. Here again, distillation and chemical separation procedures are impractical. Still another illustration, and one in which the separation problem is even more pronounced, is the incomplete oxidation of paraffin waxes.

In the petroleum art, too, there has been for many years the problem of separating organic oxygen compounds from various hydrocarbon fractions, such as paraffinic and naphthenic mixtures containing relatively small quantities of acids, alcohols, aldehydes, etc. Distillation procedures have not proven effective in removing the oxygenated materials. Chemical separation procedures have also been of little value, although alkali treatment has been effective in removing acids, but not other oxygenated materials, from hydrocarbon fractions.

Conventional selective solvents are either ineffective or not well suited for the separation under consideration here. For example, aniline and nitrobenzene are completely miscible with most of the mixtures referred to above. Another well-known solvent, furfural, is not selective with such mixtures, for it extracts some hydrocarbons together with oxygenated materials. To date, therefore, no simple and inexpensive selective solvent procedure has been developed for separating hydrocarbons and oxygenated materials of similar boiling range from mixtures containing the same.

It is an object of this invention, therefore, to provide an effective means for separating hydrocarbons and oxygenated materials of the same or similar boiling range. It is also an object of this invention to selectively separate hydrocarbons and acids, alcohols, aldehydes, esters, ketones, lactones, etc. from mixtures obtained by the incomplete oxidation of paraffins. A further object is to provide substantially pure hydrocarbon fractions from hydrocarbon fractions containing oxygenated materials. Still another object is to selectively separate oxygenated materials from petroleum fractions. Other objects and advantages of the invention will be apparent from the following description.

It has now been found that acetonitrile is selective in character and makes possible a separation of oxygenated materials from hydrocarbons of similar boiling range. Thus, it has been found that a mixture of organic oxygen compounds and hydrocarbons can be contacted with acetonitrile, whereupon the oxygen compounds are selectively extracted by the acetonitrile. The extract of oxygen compounds and acetonitrile can be resolved simply by distillation, for example, and the recovered acetonitrile can then be recycled. In the same vein, the recovered hydrocarbons can be recycled for further oxidation.

In addition to the mixtures of hydrocarbons and oxygenated materials described above, it will be apparent to those familiar with the art that numerous mixtures of such character may be used in the process of this invention. In general, however, the process is most advantageous with paraffin and naphthene hydrocarbons and their oxygenated derivatives of similar boiling range. It is particularly effective with those mixtures which boil above about 110 C., inasmuch as it has been observed that with a relatively high concentration of cyclohexane and/or methylcyclohexane in a mixture to be treated, these cyclohydrocarbons are extracted by acetonitrile. Mixtures of olefins and oxygenated materials may also be resolved by the present process; with such mixtures, however, it is recommended that somewhat more efficient extraction equipment be used than is required for mixtures containing paraffins and/or cycloparaffins. Typical olefin-oxygenated material mixtures are those obtained by Fischer-Tropsch reactions, wherein carbon monoxide and hydrogen are reacted in the presence of cobalt or iron catalysts or the like and wherein a variety of hydrocarbons and oxygenated materials are formed.

The process of this invention can be employed either as a batch operation or a continuous process and, in the latter instance, the mixture to be treated and the acetonitrile may flow concurrently or countercurrently in the contacting vessel. Acetonitrile and the mixture to be treated are mixed in a volume ratio of between about 5:1 and about 1:1 of acetonitrile to mixture. The extraction may be carried out at temperatures as low as about 0° C. to about 80° C., at atmospheric pressure. Still higher temperatures can be employed, if desired, with the use of pressure. With the higher operating temperatures, it has been found desirable to employ small amounts of water in the solvent, for example, 0 to 25 percent of water, thereby increasing the solvent's selectivity. While low temperatures below 20° C. can be used by resorting to refrigeration, there is no advantage in so operating; in this respect the instant process is advantageous in that expensive refrigeration equipment is not required. With regard to contact between the mixture and the solvent, it is recommended that they be thoroughly agitate or interdispersed in order to assure that the equilibrium distribution coefficient is approached. In general, this requires at least about two to five minutes. The time of contact may be simply regulated in batch operations as will be recognized and, in continuous operations, the rate of flow of the mixture and of the solvent can be readily regulated.

A suitable system for carrying out a continuous process in separating oxygenated materials and hydrocarbons from a mixture containing the same is shown in the accompanying diagram, where acetonitrile is introduced through conduit 1 at an upper portion of an extraction tower 2, and a suitable mixture is introduced through conduit 3 at a lower portion of the tower. The acetonitrile and the mixture flow countercurrently as shown, and the bulk of the acetonitrile containing substantially all of the oxygenated materials is withdrawn from the bottom of the tower 2 through conduit 4.

The acetonitrile and oxygenated materials in conduit 4 are introduced into fractionator 5, wherein acetonitrile is distilled off and withdrawn through conduit 1 at the top of the fractionator. Acetonitrile in conduit 1 may be used again in extraction tower 2 or may be withdrawn from the system. It will be apparent that additional fresh acetonitrile may be introduced into the system in conduit 1, through a suitable valve (not shown). The oxygenated materials are withdrawn at the bottom of the fractionator 5 through conduit 6. The hydrocarbons substantially free of oxygenated materials are withdrawn from the top of the extraction tower 2 through conduit 7. If necessary, the relatively small amount of acetonitrile contained in the hydrocarbon material can be readily removed by distillation in a suitable fractionator (not shown).

The following specific, and non-limiting, examples are representative of the results to be obtained in accordance with the process of this invention.

Example I

A mixture of naphthenes and oxygenated naphthenes was extracted with acetonitrile and with conventional solvents, namely, aniline, nitrobenzene and furfural. The mixture contained cycloparaffins, chiefly decahydro-naphthalene, and oxygenated cycloparaffins (aldehydes, alcohols and ketones). The properties of the mixture were: hydroxyl number of 29 milligrams of KOH per gram, equivalent to 5.2 per cent by weight of alcohols; carbonyl number of 54 milligrams of KOH per gram, equivalent to 9.5 per cent by weight of aldehydes and ketones; boiling range of 305–385° F. (152–196° C.).

One part, by volume, of the aforesaid mixture was contacted at 20–25° C. with two parts, by volume, of acetonitrile in a single stage extraction. The extract of oxygenated material and acetonitrile was separated from the hydrocarbon or raffinate phase, and was distilled to remove acetonitrile therefrom. The extract comprised 23 per cent by volume of the original oxidation product. The results of the extraction are tabulated below. The alcohols were determined by hydroxyl number and formation of boric acid ester, and the aldehydes and ketones by carbonyl number.

With aniline as the solvent, it was found that aniline and the oxidation mixture were completely miscible, such that no separation could be effected. This was also found to obtain with nitrobenzene.

Furfural, as shown in the table, was effective in separating oxygenated material from the hydrocarbons; however, furfural was much less selective than acetonitrile. In effect, furfural extracted a substantial quantity of hydrocarbons together with oxygenated materials. Using the results shown in the table, it will be apparent that on a comparative basis acetonitrile is about 2½ times as selective as furfural in removing oxygenated materials from the oxidation product, and that the use of furfural is not practical unless some means of recovering the furfural other than distillation or bisulfite extraction is developed.

TABLE

| Solvent | Acetonitrile | Furfural | Aniline | Nitrobenzene |
|---|---|---|---|---|
| Wt. Percent Oxygenated Material in: | | | | |
|   Charge | 14.7 | 14.7 | Completely miscible | Completely miscible. |
|   Extract | 58.0 | a 25 | do | Do. |
|   Raffinate | b 2.4 | 6.5 | do | Do. |
| Selectivity = $\frac{\text{Wt. of Oxygenated Material in Extract}}{\text{Wt. of Oxygenated Material in Charge}}$ | 87 | (a) | do | Do. |
| Wt. Percent of Original Alcohol in: | | | | |
|   Extract | 82 | (a) | do | Do. |
|   Raffinate | 18 | 12 | do | Do. |
| Wt. Percent Original Aldehydes and Ketones in: | | | | |
|   Extract | 91 | (a) | do | Do. |
|   Raffinate | 8 | 31 | do | Do. |
| Vol. Percent Extract | 23 | a 45 | do | Do. |
| Solvent-to-Hydrocarbon Ratio (Vol.) | 2:1 | 2:1 | do | Do. | a The furfural was removed from the extract by sodium bisulfite. Unfortunately, the bisulfite also extracted some hydrocarbon and practically all of the oxygenated materials; therefore, when the furfural was recovered, it contained hydrocarbon and oxygenated material which could not easily be separated (since they boil in the same range). Thus extraction with furfural does not yield any concentrated oxygenated fraction.

b A second extraction removed all of the alcohol and all of the ketones and aldehydes.

Example II

A heavy alkylate, obtained as a byproduct from butylene alkylation operations, was incompletely oxidized, non-catalytically, with air at 500° F. and 300 pounds per square inch pressure, with a space velocity of 75 and a molar ratio of air to hydrocarbon of 3. The heavy alkylate had the following properties:

| | |
|---|---|
| Specific gravity, A. P. I. | 46.4 |
| Norwood bromine No. | 70.1 |
| Iodine No. | 39 |
| Sulfur, percent | 0.02 |
| Flash point, °F. | 185 |
| ASTM distillation, °F.: | |
|   I. B. Pt. | 407 |
|   5% | 433 |
|   10% | 435 |
|   30% | 453 |
|   50% | 470 |
|   70% | 489 |
|   90% | 530 |
|   End. Pt. | 599 |

The oxidation product thus obtained was extracted with a ten per cent aqueous solution of sodium hydroxide, whereupon acids contained therein were extracted. The acids comprised one percent of the product. The alkali-treated oxidation product (99 parts by volume) was then contacted at 25° C. with three parts by volume of acetonitrile containing sixteen percent of water. The extract of solvent and oxygenated material was then distilled to a maximum temperature of 101° C. to remove the aqueous acetonitrile solvent. In this way, an extract comprising 3.6 per cent of oxygenated material was obtained. The raffinate or hydrocarbon phase was substantially free of oxygenated materials.

The extract was fractioned into a fraction (1) boiling from 200 to 280° C. and a second fraction (2) boiling from 280 to 300° C. Upon analysis, fraction (1) was found to contain approximately 20 per cent alcohols and the remainder aldehydes and ketones. Fraction (2) contained more than 95 per cent alcohols, aldehydes and ketones, with the remainder being hydrocarbons.

Example III

A naphthenic hydrocarbon charge comprising a mixture of monomethyl-, dimethyl- and trimethyl decalins, predominantly dimethyl, was incompletely oxidized under the following conditions: 525° F.; 100 pounds per square inch pressure; space velocity, 8; and molar ratio of air to hydrocarbon of 6. The hydrocarbon charge had the following properties:

| | |
|---|---|
| Specific gravity | 0.8708 |
| Specific gravity, A. P. I. | 31.0 |
| Aniline No., °F. | 140 |
| Refractive index | 1.4710 |
| ASTM distillation, °F.: | |
|   I. B. Pt. (10 mm.) | 122 (approx. 325 @ 760 mm.) |
|   10% | 185 |
|   25% | 212 |
|   50% | 217 |
|   75% | 230 |
|   85% | 248 (490 @ 760) |
|   Residue—15% | |

The oxidation product obtained was extracted at 25° C. with the aqueous acetonitrile described in Example II, using a continuous extraction technique in which the acetonitrile was continuously passed through a packed tower filled with oxidation product. The acetonitrile taken from the extraction tower was continuously separated from the extract by distillation, and was recycled. The oxygenated material thus obtained comprised ten per cent of the original oxidation product; this represented eighty per cent of the oxygenated material originally present in the oxidation product.

It is to be understood that the foregoing description and specific examples serve to illustrate the invention and that many variations and modifications may be made therein without departing from the spirit and scope of the appended claims.

We claim:

1. In the process for producing valuable organic oxygen compounds from hydrocarbons, which includes partially oxidizing a hydrocarbon to produce an oxidation product containing organic oxygen compounds including acids and hydrocarbons of similar boiling range, and which includes separating said oxygen compounds including said acids from said hydrocarbon, the improvement which consists of the following sequence of operations: (a) contacting said mixture with acetonitrile; (b) establishing phase separation into an extract phase rich in said oxygen compounds including said acids, and a raffinate phase less rich in said oxygen compounds than said oxidation product; (c) separating the extract and raffinate; (d) removing said acetonitrile from the extract phase to provide a concentrate of said oxygen compounds including said acids.

2. The process of claim 1 wherein the volume ratio of said acetonitrile to said mixture is between about 1:1 and about 5:1.

3. The process of claim 1 wherein the mixture has a boiling point above about 100° C. and contains paraffins and oxygenated derivatives thereof of similar boiling point.

4. The process of claim 1 wherein the mixture has a boiling point above about 100° C. and contains olefins and oxygenated derivatives thereof of similar boiling point.

5. The process of claim 1 wherein the mixture has a boiling point above about 100° C. and contains naphthenes and oxygenated derivatives thereof of similar boiling point.

6. The process of claim 1 wherein the mixture contains naphthenes and oxygenated derivatives thereof and has a boiling range of about 305–385° F.

7. The process of claim 1 wherein the mixture contains paraffins and olefins and oxygenated derivatives thereof and has a boiling range of about 433–600° F.

8. The process of claim 1 wherein the mixture contains naphthenes and paraffins and oxygenated derivatives thereof and has a boiling range of about 325–550° F.

9. The process defined by claim 1 wherein an aqueous mixture of acetonitrile is used, the acetonitrile containing up to about twenty-five per cent by volume of water.

WILLIAM I. DENTON.
RICHARD B. BISHOP.

REFERENCES CITED

The following references are of record in the file of this patent:

UNITED STATES PATENTS

| Number | Name | Date |
|---|---|---|
| 2,522,678 | Kozacik et al. | Sept. 19, 1950 |

OTHER REFERENCES

Hoerr et al., J. Org. Chem., vol. 9, pp. 267–80 (1949).

Garland et al., ibid., vol. 8, pp. 344–57 (1943).

Hoerr et al., ibid., vol. 9, pp. 329–37.